Sept. 12, 1939.  W. LINDER  2,172,740
PROCESS FOR THE CONTINUOUS PRODUCTION OF WATER GAS, FREE
OF HYDROCARBONS, FROM BITUMINOUS FUELS
Filed June 28, 1937
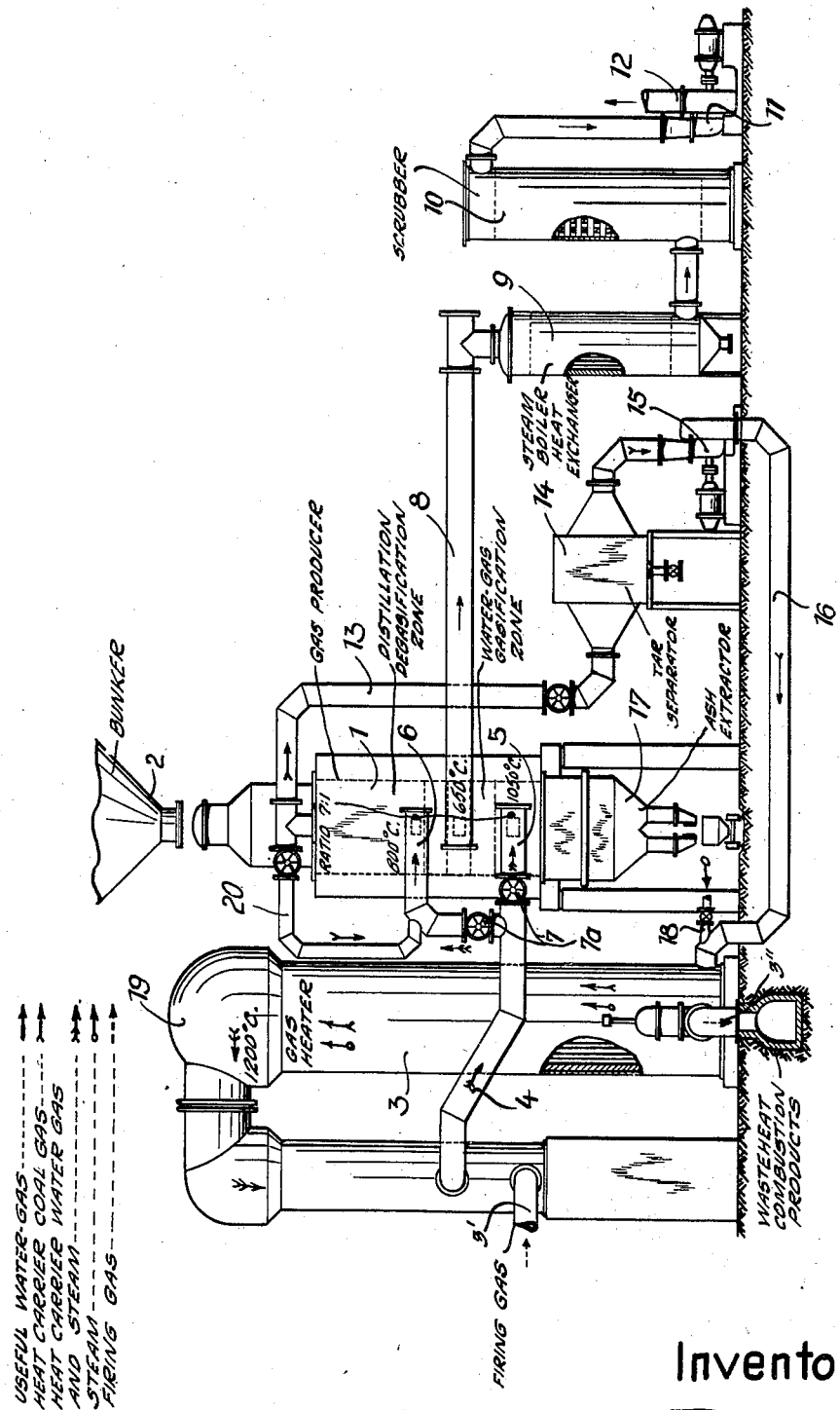
Inventor:
Willy Linder.

UNITED STATES PATENT OFFICE 2,172,740

PROCESS FOR THE CONTINUOUS PRODUCTION OF WATER GAS, FREE OF HYDROCARBONS, FROM BITUMINOUS FUELS

Willy Linder, Essen-Bredeney, Germany, assignor, by mesne assignments, to Koppers Company, Pittsburgh, Pa., a corporation of Delaware Application June 28, 1937, Serial No. 150,700
In Germany June 29, 1936

8 Claims. (Cl. 48—202)

The invention relates to the method of continuously producing water-gas, in which a suitable gas, e. g., a part of the water-gas produced is circulated through the gas producer which contains the fuel to be gasified and a heater, said gas after being heated to high temperatures within the heater carries the heat therefrom to the producer and transfers the required heat to the fuel in the producer for the formation of water-gas and more particularly the production of water-gas free or nearly free from hydrocarbons from bituminous fuels of any kind in the producer.

More recently, the production of water-gas from bituminous fuels, such as brown coal or brown coal briquettes, has become very important inasmuch as the water gas proves to be a valuable basic or primary product for the synthesis of hydrocarbons (motor fuel) from solid fuels, for instance coal, or brown coal. If the water gas is to be used for the synthesis of hydrocarbons, for instance by hydrogenation under pressure or by the catalytical conversion of carbon monoxide and hydrogen under normal or slightly increased pressure, the water gas has to be free from hydrocarbons. The hydrocarbons contained in such water gas (often called synthesis gas) is especially very unconverted in the catalytical manufacture of hydrocabons from carbon monoxide and hydrogen, as the hydrocarbons tend to precipitate as gums on the surface of the catalyst carrier, thus rendering the catalysts ineffective.

If the process for making synthesis gas is based upon the idea of using as a starting fuel, non-bituminous fuels, such as coke which is commonly used for the production of blue water-gas, then the manufacture of water-gas free of hydrocarbons does not offer any serious difficulties. The water-gas produced by treating bituminous fuels such as brown coal according to the water-gas processes hitherto known, however contains a fairly high percentage of tarry matters. Such water-gas which is in fact a mixture of distillation gas and water-gas and which gas, will hereinafter be called "coal water-gas", demands a special treatment in order to remove the hydrocarbons (tarry constituents) developed when heat'ng the bituminous fuels to the temperature of the water-gas reaction or to decompose them into products not harmful for the purpose in question.

The conversion of bituminous fuels, e. g., brown coal into water gas, is principally carried out in three stages.

(a) When the fuel is heated to the temperature of the water-gas reaction, it first of all loses water.

(b) After the drying process, the degasification of the fuel then takes place which is often called distillation. During the degasification period the bituminous matter of the fuel will be driven off as hydrocarbons, which are partly condensable and partly non-condensable. Among these hydrocarbons are certain constituents which tend to form gum-like products and such gums deposit after a certain time from the gas upon suitable surfaces, especially in those instances when the gas velocity is reduced as is, for instance, the case in the contact apparatus of the synthesis plants.

(c) As soon as the fuel has reached a temperature of about 700° C. on further heating after said distillation, water-gas is formed by the conversion of the carbon of the fuel with steam according to the well-known reaction for such synthesis gas.

The aim to manufacture a coal water-gas which is free from hydrocarbons (also termed by me in this specification "secondary coal water-gas") does not seem to be very difficult, since the temperatures of the degasification stage and the water-gas stage are distinctly different from each other. It is obvious that the production of water-gas, free of hydrocarbons, from bituminous fuels would be successful if only those gases produced by reaction at temperatures above 750–800° C., i. e., the water-gas alone, are extracted separately from the fuel. The practical carrying out of this idea, however, meets with considerable difficulties. Although it may seem to be possible to carry out the drying, the degasification and the gasification of the fuels in various separate chambers, which are sealed from one another in a gas-tight manner, by transferring the fuel from one treating chamber into another, the fuel is in highly heated condition, and the construction of the necessary sealing and extracting means offers great difficulties, which cannot be overcome in a practical way, due to the high operating temperatures that must be held in the treating chambers and the further fact that with such procedure the fuel will be unavoidably subjected to a very disadvantageous crushing action in the mechanical extracting and sealing devices.

The conversion of bituminous fuels into water-gas in continuous operation will, therefore, only be a practical success is the distillation degasification and water gas reaction gasification steps are performed in a single treating chamber.

The fuel may be treated for instance in a vertical shaft into which the heat carrying gas, which serves to transfer the heat, is introduced from below. The useful water-gas is then drawn off from a middle zone of the vertical shaft and a mixture of water-gas and distillation- or low-temperature distillation gas from the top part of the shaft, said mixture being sent back again to the heaters, for use as the heat-carrying gas.

This mixture of water-gas and low-temperature distillation gas, after steam has been added, if necessary, enters the heater wherein it is raised to such a high temperature, that the hydrocarbons react with the steam and are decomposed into hydrogen and carbon monoxide. The heat carrying gas introduced into the gasifier from below, therefore, will not contain any tarry hydrocarbons.

It follows from the foregoing, that the process in the gas generator or gasifier may be divided into two stages, i. e., the preliminary distillation degasification zone in the upper section of the gasifying chamber and the water gas reaction gasifying zone in the lower section of the gasifying chamber. The outlet for useful gas from the producer shaft has to be arranged near the end of the water gas reaction gasifying zone, in order to obtain as high a yield of water-gas as possible. On the other hand, the outlet for useful gas must be situated so far away from the distillation degasification zone, that no hydrocarbons can be drawn into the useful water-gas outlet from the distillation zone of the fuel column.

In order to withdraw a water-gas of a certain composition from the producer, it is further advisable to keep the height of the fuel bed in the gasifying zone as well as also the temperature gradient in the gasifying zone, always constant independently of the volume of the heat carrying gas, or of the useful gas passed through the producer. This essential condition for the production of a suitable water-gas containing a definite quantity of CO, H₂, CO₂ can not be fulfilled if the gasification and the degasification of the fuel is carried in in the manner known hitherto. If for instance the throughput capacity of the producer is increased, a greater quantity of heat has to be introduced into the degasification zone, and such greater quantity of heat cannot be introduced without altering the temperature of the heat carrying gas that enters the gasifying zone, and hence also the temperature gradient within the gasifying zone. By altering the temperature of the heat carrying gas, the water-gas reaction will, however, be affected and a water-gas of a considerably different composition will be produced. Within certain limits, it may of course be possible to alter the quantity of useful gas produced in the gas generator, by changing the quantity of heat carrying gas entering the water-gas zone of the gas generator under a uniform temperature. The increase in quantity of useful gas, which is rendered possible in this way, is, however, only comparatively small, since the higher the circulating velocity of the heat carrying gas the greater is the resistance to which the heat carrying gas is subjected within the gas producing system. If the velocity of the heat carrying gas is too high, there results another serious disadvantage in that ash and particles of fuels are carried away from the gas producer along with the heat carrying gas, thus fouling the useful gas and also the heat carrying gas circulating through the gas producing system back to the gas heater.

The object of my present invention now consists in providing such improvements for the above described well known process of continuous production of water-gas from bituminous fuels, which improvements will render possible the manufacture of a water-gas, free or nearly free from hydrocarbons and the composition of which (especially the content of carbon monoxide, hydrogen and carbonic acid) gives a definitely equal value without showing any of the disadvantages set forth in the foregoing.

The main feature of my invention now makes provisions to supply the heat requirement of the degasification zone in the gasifier with a partial stream of water-gas, independent from the heat stream which flows together from the gasifying zone upwards into the degasification zone situated above.

According to the present invention, I divide for instance the heat carrying gas stream, leaving the heater, into two separately adjustable streams, before entering the gas producer, of which the one stream enters the gasifying zone of the gas generator and the other the degasification zone. The quantities of the heat carrying gas which, according to the invention, have to be delivered into the various zones of the gas generator are so adjusted, that if possible, such a quantity of heat is passed into the gasifying zone as is necessary to obtain the desired composition of the useful gas, whereas the partial stream to be introduced into the degasification zone is determined in such a way, that under each operating condition the heat required for the total degasification of the fuel less the heat carried upwards by the gases rising from the gasifying zone is supplied.

By means of this dividing of the heat carrying gas stream it is possible, as already shown in the foregoing, to produce water-gas always of a uniform composition, which is completely free from any unconverted hydrocarbons. By means of the invention it is further possible to keep the limit between the gasifying zone and the degasification zone at a certain definite point or level, somewhat above the outlet for useful gas, so that no undesired hydrocarbons can escape into the useful gas outlet. By means of the highly heated circulating gas entering the degasification zone from below, the fuel is completely degasified before it enters the gasifying zone of the gas producer. If the heat carrying gas introduced into the degasifying zone has a temperature of about 900° C., it is obvious that in using my invention the degasification of the fuel will be completely finished before the fuel enters the gasifying zone.

My invention incorporates further improvements in that the heat in the upper section of the gas producer, i. e., in the degasifying or distillation zone, is introduced by making use of a special circulation of the heat carrying gas, which special circulation is independent or partially independent of the heat carrying gas stream circulating through the lower section of the gas producer. For this special circulation of the heat carrying gas, I provide either a special gas heater or I provide the main gas heater of the installation with special discharging places, so that a heat carrying gas of a lower temperature than necessary for the formation of water-gas can be introduced into the degasifying zone of the gas producer.

Another mode of carrying out my invention consists in the use of superheated steam for transferring the heat into the degasifying zone of the gas producer, preferably that steam which has to be added to the heat carrying gas, in order to enable the formation of water-gas in the lower section of the gas producer.

If the steam which has to be added to the heat carrying gas, in order to effect the formation of water-gas in the lower section of the gas producer, is used as the heat-carrier for the degasifying zone, or if a portion of this steam is used to transfer the heat into the degasifying zone, in accordance with the present invention, it is then possible to treat the heat carrier in a common type of steam superheater. The superheated steam having, for instance, a temperature of 750° C. and being introduced into the gasifying zone, transfers its heat to the fuel. A mixture consisting of distillation gases and steam is produced and, if the temperature of the mixture is kept above the dew point of steam, said mixture may be circulated without any loss of steam into the main heat carrier gas heater. Here, the mixture is highly heated and the tarry matters and other hydrocarbons of the gas are nearly completely converted into hydrogen and carbon monoxide, so that a steam-gas mixture pure of hydrocarbons flows from the gas heater into the gasifying zone of the gas producer.

The permanent gases contained in this gas mixture (hydrogen and carbon monoxide) serve as the heat transferring medium by which such a quantity of heat is introduced into the gasifying zone of the gas producer, as to cause a proper formation of water-gas.

I now provide a further improvement according to my invention, in the event that the quantity of additional steam, necessary for the formation of water-gas, is not large enough to cover the heat required by the low-temperature distillation and normal distillation zone. To this end, I contemplate, within my invention, drawing a part of hot gases, i. e., useful gases of the proper composition, from the gasifying zone upwards into the degasifying zone, so that the distillation of the fuel may be completely finished in that zone. However, in carrying out my invention, in this way, the quantity of useful gas may be disadvantageously reduced.

To overcome such disadvantages in such cases, when the gas producing plant is used for the synthesis of hydrocarbons according to the Fischer-Tropsch process, according to my invention I introduce steam instead into the degasifying zone of the gas producer or besides, superheated steam and also hot residual gas from the synthesis plant, that is, the gas left over from the treatment of synthesis gas on the catalysts of the Fischer-Tropsch plant.

The technical advantages offered by this mode of carrying out the invention are very considerable.

The Fischer-Tropsch process for the synthesis of hydrocarbons demands a synthesis gas which is nearly free from any sulphur compounds. Consequently, the non-converted residual gas leaving the contact furnaces is also free from sulphur compounds. The residual gas contains low molecular weight hydrocarbons (especially $CH_4$) which have been formed on the contact material and in addition to same, it contains carbonic acid and a certain amount of hydrogen, carbon monoxide and inerts. Such a gas can be highly heated in metallic recuperators, without offering any difficulties, whereas coal distillation gases rich in sulphur compounds will quickly destroy the metal walls of the recuperators.

In this way it is possible to eliminate the need for flowing the quantity of the synthesis gas rising from the gasifying zone into the degasifying zone, and to withdraw the valuable synthesis gas to the full amount from the gas producing system. The production of useful gas in the installation is, therefore, essentially increased.

Another important advantage of the last-mentioned mode of carrying out my present invention consists in that the residual gas of the hydrocarbon synthesis plant is suitable for use as part of the heat-carrying medium and economically converted into synthesis gas of proper composition. The residual gas together with steam and the distillation gas of the degasifying zone are introduced into the heat carrier gas-heater, where under the influence of a high temperature, this residual gas is decomposed into hydrogen and carbon monoxide.

Under certain conditions it is also possible to use instead of the residual gas another kind of gas, for instance desulphurised coal distillation gas, or the like.

Moreover, it is possible to operate the process according to my invention in such a way, that only small quantities of the synthesis gas are circulating as the heat carrying medium, for instance such a quantity, which is necessary only for maintaining the desired pressure difference between the gasifying and degasifying zone.

For the purpose of heating the steam and the residual gas, it is preferable to introduce both the media together into the recuperator. It is, however, also possible to perform a separate heating, and then introducing the hot mixture of steam and residual gas into the gas producer at a point which lies somewhat above the synthesis gas outlet. Under certain conditions it is also possible to provide several inlets, situated at different levels, for introducing the hot mixture of steam and residual gas, for instance to maintain a definite distribution of the temperature within the degasifying zone of the gas producer.

In order that this invention may be more readily understood and carried into practice, reference is hereby made to the accompanying drawing, showing a schematic arrangement of a plant, suitable for carrying out the process according to the invention.

The gas producer shaft 1 is top-charged from the bunker 2 with the fuel to be treated, for instance brown coal or briquettes. The gas heater 3 serves for heating-up the heat carrying gas stream. The gas heater 3 is connected to the gas producer 1, through pipelines 4, 5 and 6. The pipelines 5 and 6 are controlled by valves 7 and 7a respectively and the quantity of gas passing the pipeline 5, 6 may be separately regulated thereby.

The branch pipeline 5 enters the gas generator 1 near the bottom whereas the branch pipeline 6 enters the gas generator 1 at a point near the middle zone. If the gas generator 1 is charged with fuel, it is heated by means of the heat carrying gas. The degasification (low-temperature distillation and normal temperature distillation) takes place in the upper section of the gas generator and the formation of water-gas is effected in the lower section of the gas generator. The water-gas to be withdrawn as useful gas is discharged through the pipeline 8, which leaves the middle zone of the gas generator somewhat underneath the entrance of the heat carrying gas branch 6. The useful gas which has for instance a temperature of 650° C. flows through a heat exchanger 9 (steam boiler) and a scrubber 10, from which it is delivered by means of the gas exhauster 11 through the pipeline 12 to the place of utilization.

The gas produced in the upper section of the gas generator is led through the pipeline 13, which pipeline connects with the gas generator near the top. The gases coming through the pipeline 13 then flow into a tar separator 14, in which the gases are freed from tar and other suspensions. The gas thus purified then flows through the pipeline 16 into the gas heater 3 by means of the blower 15.

The residue of the gasification process which is found in the lowest section of the gas generator preferably consists of a mixture of ash and unburnt carbon. This mixture is extracted from the gas generator 1 by means of the arrangement 17. Steam from other sources also may be introduced into the heater 3 or the pipeline 16 through pipeline 18.

The installation is suitably fitted with two or several gas heaters 3, so that alternately one of the gas heaters may warm up the circulating heat-carrying-gas while another is concurrently being preheated by inflow of firing gas through inlet 3' and out to a stack through outlet 3'' thus enabling a continuous formation of water-gas.

The method of operating the installation indicated on the drawing is as follows:

The mixture of heat carrying gas and steam is heated-up in the gas heater 3 to such a degree, that it shows a temperature of about 1200° C. in the dome 19 of the heater 3. The temperature is suitably maintained at this high degree, so that all hydrocarbons contained in the heat carrying gas are decomposed or converted with the steam. By providing catalysts, this temperature may be reduced under certain conditions.

The hot heat carrying gas then flows through the pipeline 4 into the gas generator 1. Such an amount of heat carrying gas is introduced into the lower gasification zone of the gas generator through the pipeline 5, that a drop in temperature of about 1050–650° C. is found from the entrance of the pipeline 5 up to the synthesis gas outlet through the pipeline 8, under the assumption that this temperature fall gradient gives the necessary composition of synthesis gas as regards the content of carbon monoxide and hydrogen, due to the height of the fuel column caused by the position of the synthesis gas outlet relative to the heat carrying gas inlet. Moreover, the temperature fall or gradient is also dependent upon the reactivity of the carbon contained in the fuel, which must be taken into consideration when calculating the quantity of the heat carrying gas to be made to flow through the pipeline 5.

A partial stream of the heat carrying gas is introduced through the branch 6 into the upper section of the gas generator and a volume of this srteam is adjusted by valve 10, so that the degasification or distillation of the fuel is completed in the upper section of the gas generator when the fuel flows through the zone near the synthesis gas exit pipe 8 on its way downwards through the gas generator. The proportion of the gas quantity flowing through the pipelines 5 and 6 is of course also dependent on the composition of the coal, especially its percentage of volatiles. The proportion of the gas flowing through the pipeline 5 to the proportion of the partial stream flowing through the pipeline 6 is for instance 7:1 for a certain fuel.

Instead of introducing a partial stream of the heat carrying gas into the upper section of the gas generator, i. e. into the degasification zone, it is also possible to have a special gas circulation for the degasification zone by withdrawing a part of the gases from the pipeline 13, through pipeline 20 or a suitable heater (not shown), connected to the pipeline 20 and leading such part of the gas back again into the degasifying zone of the gas generator nearly at the height of the entrance for the pipeline 6.

Instead of arranging a special heat exchanger for this circulation, a partial stream of the relatively cold circulating gases leaving the pipeline 13 can be mixed with the hot heat carrying gases entering the degasifying zone through the branch 6. The proportion of the heat carrying gas to cold circulating gas is then adjusted preferably so that the desired temperature for instance 800° C. is maintained at the entrance of the gas pipeline 6 into the gas generator. By a suitable control of the temperature of the gases, which are introduced into the degasifying zone of the gas generator, it is possible to maintain a definite temperature fall or gradient over the whole height of the gas generator, if the quantity of the heat carrying gas entering the degasifying zone has been properly determined. This temperature fall or gradient must be in accordance with the most favourable method of operating the gas generator for the particular kind of fuel being gasified.

I have now described my present invention on the lines of a preferred embodiment thereof, but my invention is not limited in all its aspects to the mode of carrying it out as described and shown, since the invention may be variously embodied within the scope of the following claims.

I claim:

1. In a method of continuously producing water-gas free of hydrocarbons from distillable solid fuels, which comprises: maintaining in a bed of continuously descending fuel aforesaid a lower water-gas reaction zone and an upper predistillation zone, and withdrawing the hydrocarbon free water-gas from the fuel bed at a zone intermediate the upper distillation zone and the lower water-gas zone; introducing the fuel to be degasified at the top of the bed and withdrawing the residue as solids from the bed below the water gas-reaction zone; and effecting said maintenance of the zones of the fuel bed by traversing the upper distillation zone with a preheated gaseous heat carrier medium and circulation of the medium from the upper distillation zone together with hydrocarbons therefrom and steam through a separate gas heating-up stage to reheat the medium and thence back to the fuel bed through the lower water-gas reaction zone for the water-gas reaction therewith; the improvement comprising: introducing the gaseous heat carrier medium for each of the upper and lower zones as separate streams individual to the respective zones, and independently of the other zone, and in quantities for the respective zones to supply the heat for the respective zones by the separate streams therefor.

2. A method as claimed in claim 1 and in which the heating medium for the separate stream for the upper distillation is constituted of a smaller quantity of the same gas from the heating-up stage that is supplied as a separate stream to the lower water-gas reaction zone, and at the same temperature.

3. A method as claimed in claim 1, and in which the heating of the upper distillation zone by the separate stream therefor is effected by withdrawing the gas therefor from the heating-up stage at a region thereof where the temperature is lower than the region where the gas for the stream for the lower water-gas reaction zone is withdrawn from the heating-up stage.

4. A method as claimed in claim 1, and in which the heating of the upper distillation zone is effected by the steam normally added to the process for the water-gas reaction and superheated prior to entrance thereto as the separate stream therefor.

5. A method as claimed in claim 1, and in which the heating of the upper distillation zone is effected by preheated steam normally to be added to the process together with preheated leftover gas from the Fischer-Tropsch process for the synthesis of hydrocarbons from the made water gas.

6. The process as claimed in claim 1, wherein a regulatable part of the gas produced in the distillation zone of the producer is withdrawn from the medium being circulated to the heating-up stage and is added to the gas stream as it is being introduced into the upper zone of the producer charge.

7. The process as claimed in claim 1, wherein a part of the gases formed in the lower zone is passed from the lower zone into the upper zone of the producer, whereby a difference in pressure is maintained between the said lower and said upper zone.

8. The process as claimed in claim 1, wherein the residual gas produced in the Fischer-Tropsch process for the synthesis of hydrocarbons out of hydrogen and carbon monoxide is used as a heat carrier for heating the upper zone of the producer.

WILLY LINDER.